United States Patent
Moriya et al.

(10) Patent No.: US 9,060,157 B2
(45) Date of Patent: Jun. 16, 2015

(54) MOVING IMAGE CODING APPARATUS AND MOVING IMAGE DECODING APPARATUS

(71) Applicant: MITSUBISHI ELECTRIC CORPORATION, Chiyoda-ku (JP)

(72) Inventors: Yoshimi Moriya, Tokyo (JP); Shunichi Sekiguchi, Tokyo (JP); Yoshihisa Yamada, Tokyo (JP); Kohtaro Asai, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 12 days.

(21) Appl. No.: 13/918,205

(22) Filed: Jun. 14, 2013

(65) Prior Publication Data

US 2013/0279578 A1 Oct. 24, 2013

Related U.S. Application Data

(62) Division of application No. 12/067,729, filed as application No. PCT/JP2006/318861 on Sep. 22, 2006, now Pat. No. 8,467,450.

(30) Foreign Application Priority Data

Sep. 26, 2005 (JP) ................................. 2005-278369

(51) Int. Cl.
*H04N 7/12* (2006.01)
*H04N 19/61* (2014.01)
(Continued)

(52) U.S. Cl.
CPC ................. *H04N 7/50* (2013.01); *H04N 19/50* (2014.11); *H04N 19/176* (2014.11); *H04N 19/51* (2014.11); *H04N 19/61* (2014.11)

(58) Field of Classification Search
CPC .............. H04N 7/50; H04N 19/00587; H04N 19/00278; H04N 19/00569; H04N 19/00733
USPC .............. 370/240.01, 240.12, 240.16, 240.24
See application file for complete search history.

(56) References Cited

U.S. PATENT DOCUMENTS 6,744,817 B2 6/2004 Chun et al.
8,467,450 B2 * 6/2013 Moriya et al. ........... 375/240.12
(Continued)

FOREIGN PATENT DOCUMENTS

JP 6-209469 7/1994
JP 8 18976 1/1996
(Continued)

OTHER PUBLICATIONS

Korean Office Action issued Jul. 29, 2013 in Patent Application No. 10-2013-7014543 with English Translation.
(Continued)

*Primary Examiner* — Kan Yuen
(74) *Attorney, Agent, or Firm* — Oblon, McClelland, Maier & Neustadt, L.L.P.

(57) ABSTRACT

An apparatus to decode an encoded bit stream obtained by dividing the moving image into a plurality of rectangular regions includes a rectangular region size determination unit for determining a variable size of the regions in a sequence (a set of continuous frames) based on region size information multiplexed in the encoded bit stream. The apparatus includes a decoding unit for decoding coding mode information multiplexed in the encoded bit stream for each of the regions, and a decoding unit. The coding mode information includes (1) prediction type information selected from information indicating either inter or intra prediction coding, and (2) intra prediction block size information indicating a size of a unit region for the intra prediction coding indicated by the prediction type information.

3 Claims, 6 Drawing Sheets

(51) Int. Cl.
*H04N 19/50* (2014.01)
*H04N 19/176* (2014.01)
*H04N 19/51* (2014.01)

(56) References Cited

U.S. PATENT DOCUMENTS

| | | | |
|---|---|---|---|
| 2004/0091049 A1* | 5/2004 | Yamaguchi et al. | 375/240.16 |
| 2004/0114686 A1 | 6/2004 | Sugiyama et al. | |
| 2006/0159165 A1 | 7/2006 | Lu et al. | |
| 2007/0147514 A1 | 6/2007 | Yamaguchi et al. | |
| 2007/0291838 A1 | 12/2007 | Kim et al. | |
| 2009/0010541 A1 | 1/2009 | Aihara | |
| 2013/0064292 A1* | 3/2013 | Song et al. | 375/240.03 |

FOREIGN PATENT DOCUMENTS

| | | |
|---|---|---|
| JP | 8-18976 | 1/1996 |
| JP | 8-205140 | 8/1996 |
| JP | 9-130801 | 5/1997 |
| JP | 11-122610 | 4/1999 |
| JP | 11 146367 | 5/1999 |
| JP | 11-164305 | 6/1999 |
| JP | WO02/080574 A1 | 10/2002 |
| JP | 2003 250161 | 9/2003 |
| JP | 2003-319394 A | 11/2003 |
| JP | 2003-319394 A5 | 11/2003 |
| JP | 2004-254327 | 9/2004 |
| JP | 2005-160048 | 6/2005 |
| JP | 2006-157481 | 6/2006 |
| JP | 5409824 | 2/2014 |
| WO | WO 01/56298 A1 | 8/2001 |

OTHER PUBLICATIONS

Japanese Office Action issued Jul. 30, 2013, in Japan Patent Application No. 2012-015359 (with English translation).
Japanese Office Action issued Nov. 29, 2011, in Patent Application No. 2011-033302 (with English language translation).
Office Action issued on Dec. 21, 2010 in Japanese Patent Application No. 2007-536577 (with English language abstract).
Extended Supplementary European Search Report issued on Mar. 16, 2011 in corresponding European Application No. 06 79 8249.
Thomas Wiegand et al., "Overview of the H.264/AVC Video Coding Standard", IEEE Transactions on Circuits and Systems for Video Technology, Jul. 1, 2003, vol. 13, No. 7, XP 011221093, pp. 560-576.
Yao Wang et al., "Error Resilient Video Coding Techniques: Real-Time Video Communications Over Unreliable Networks", IEEE Signal Processing Magazine, Jul. 1, 2000, vol. 17, No. 4, XP 011089872, pp. 61-82.
Guy Côté et al., "H.263+: Video Coding at Low Bit Rates", IEEE Transactions on Circuits and Systems for Video Technology, Nov. 1, 1998, vol. 8, No. 7, XP 011014514, pp. 849-866.
Office Action issued May 24, 2011 in Japan Patent Application No. 2007-536577 with English language translation.
Japanese Office Action issued Sep. 24, 2014, in Japan Patent Application No. 2013-271813 (with English translation).
Japanese Office Action issued Aug. 12, 2014, in Japan Patent Application No. 2013-201774 (with English translation).

* cited by examiner (a)

(e)

(b)

(f)

(c)

(g)

(d)

(h)

(h)

(i)

(j)

(k)

MOVING IMAGE CODING APPARATUS AND MOVING IMAGE DECODING APPARATUS

CROSS-REFERENCE TO RELATED APPLICATIONS

The present application is a divisional application of and claims the benefit of priority under 35 U.S.C. §120 from U.S. application Ser. No. 12/067,729, filed Mar. 21, 2008, the entire contents of which is incorporated herein by reference. U.S. application Ser. No. 12/067,729 is a national stage of International Application No. PCT/JP2006/318861, filed Sep. 22, 2006, which is based upon and claims the benefit of priority under 35 U.S.C. §119 from prior Japanese Patent Application No. 2005-278369, filed Sep. 26, 2005.

FIELD OF THE INVENTION

The present invention relates to a moving image coding apparatus which divides a moving image into rectangular regions and codes the moving image in units of the rectangular regions, and a moving image decoding apparatus which decodes a coded moving image in units of rectangular regions.

BACKGROUND OF THE INVENTION

As a conventional method of coding or decoding an image signal, there has been provided MPEG-4 (Moving Picture Experts Group Phase-4) visual (ISO/IEC 14496-2). MPEG-4 is a method of regarding a moving image sequence as a collection of moving image objects each of which has an arbitrary shape in space and in time, and performing coding and decoding the moving image sequence in units of each moving image object.

In MPEG-4, each moving image object including a time axis is referred to as a Video Object, each element of a Video Object is referred to as a Video Object Layer (VOL), each element of a VOL is referred to as a Group of Video Object Plane (GOV), and image data which shows the state of a GOV at each time and which is used as a unit to be coded is referred to as a Video Object Plane (VOP). In a case of handling an object of rectangular shape, a VOP corresponds to a frame. Each VOP is coded in units of each macro block which is a unit region to be coded. Each macro block is a rectangular block of 16 pixels×16 lines. Each macro block is further divided into blocks of 8 pixels×8 lines, and a motion compensation prediction is performed in units of each macro block or each block of 8 pixels×8 lines.

Selection of the size of each block for the motion compensation prediction can be changed for each of the macro blocks. Whether to code a target macro block can be determined for each of the macro blocks. When not coding the target macro block (in a non-coding mode), decoded data about a macro block at the same position (right in back) of an immediately-previous frame are used. When the target macro block is coded, whether to perform a motion compensation prediction (an inter coding mode) or to perform the coding using only information about the target frame without performing any inter frame prediction using a motion compensation prediction (an intra coding mode) can be selected in units of each macro block.

Furthermore, there has been provided an image coding/decoding method of being able to divide an image into macro blocks having a plurality of sizes in division of the image into blocks when performing a coding process, thereby making a macro block corresponding to a part of the image with higher importance in its image quality have a smaller size and also making a macro block corresponding to a part of the image with lower importance in its image quality have a larger size (for example, refer to patent reference 1).

[Patent reference 1] JP,11-146367,A

A problem with such the conventional image coding/decoding method is that because the macro block size is fixed, the macro block size cannot be changed adaptively according to the resolution of the image or the descriptions of the image (the fineness of a pattern of the image, the intensity of a motion in the image, etc.). Particularly, when the resolution of the image becomes high, the use of the fixed macro block size adopted by the conventional image coding/decoding method causes a case in which a region covered by macro blocks is localized, and neighboring macro blocks have the same coding mode or the same motion vector. In such a case, because the overhead due to coding mode information and motion vector information which are coded in units of each macro block increases though the prediction efficiency does not increase, the whole coding efficiency decreases.

When the image has few motions or any motion in frames of the image is constant even if the image has a low resolution, the conventional image coding/decoding method causes a case in which neighboring macro blocks have the same coding mode (non-coding mode) or the same motion vector. Generally, when the size of each macro block is large, the amount of information about the overhead required in units of each macro block, such as the coding mode, can be reduced. However, because switching of the coding mode in units of a unit region having a smaller size than the macro block size cannot be performed, the prediction efficiency in the vicinity of a boundary of a region having large intensity of motion or a region including different motions (a person and a background, or the like) decreases, and therefore the coding efficiency decreases. In contrast, when the size of each macro block is small, although the number of macro blocks increases and the amount of information about the overhead, such as the coding mode, increases, because switching of the coding mode can be performed adaptively in the vicinity of a boundary of a region having large intensity of motion or a region including different motions (a person and a background, or the like), the predictive efficiency is improved and therefore the coding efficiency is improved.

Furthermore, a problem with the technology disclosed by above-mentioned conventional patent reference 1 is that because the size is changed adaptively within each frame, the amount of codes of the rectangular size information is large.

SUMMARY

Exemplary implementations of this disclosure are directed to solving the above-mentioned problems, and it is therefore an object of the exemplary implementations to provide a moving image coding apparatus which can code an image while changing the size of each of rectangular regions adaptively according to the resolution or the descriptions of the image, and which can suppress the increase in the rectangle size information of the coded image due to the changing, and a moving image decoding apparatus.

According an exemplary implementation, an moving image decoding apparatus for decoding an encoded bit stream obtained by dividing the moving image into a plurality of rectangular regions, where each of the rectangular regions having at least a unit region, can include a rectangular region size determination unit for determining or circuit to determine a variable size of the rectangular regions in a sequence based on rectangular region size information multiplexed in the encoded bit stream, the sequence being a set of a plurality of continuous frames. The apparatus can also include a coding mode decoding unit for decoding or circuit to decode a coding mode information multiplexed in the encoded bit stream for each of the rectangular regions, and a rectangular region decoding unit. The coding mode information can include (1) prediction type information selected from information indicating either (a) inter prediction coding or (b) intra prediction coding, and (2) intra prediction block size information indicating a size of a unit region for the intra prediction coding indicated by the prediction type information. Other exemplary implementations of the teachings of this application, such as a moving image decoding method, can also be provided.

DISCLOSURE OF THE INVENTION

A moving image coding apparatus in accordance with the present invention includes: a rectangular region size determination means for determining a size of each of the rectangular regions for either each frame or each sequence which is a set of a plurality of continuous frames; a rectangular region dividing means for dividing an inputted image into rectangular regions each having the size determined by the rectangular region size determination means; and a rectangular region coding means for determining a coding mode for each of the rectangular regions, and for coding pixel values in each of the rectangular regions in the determined coding mode.

Because the moving image coding apparatus in accordance with the present invention determines the size of each of the rectangular regions for each frame or each sequence which is a set of a plurality of continuous frames, the moving image coding apparatus can code the image while changing the rectangular region size adaptively, and can suppress the increase in the rectangular size information of the coded image due to this changing.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
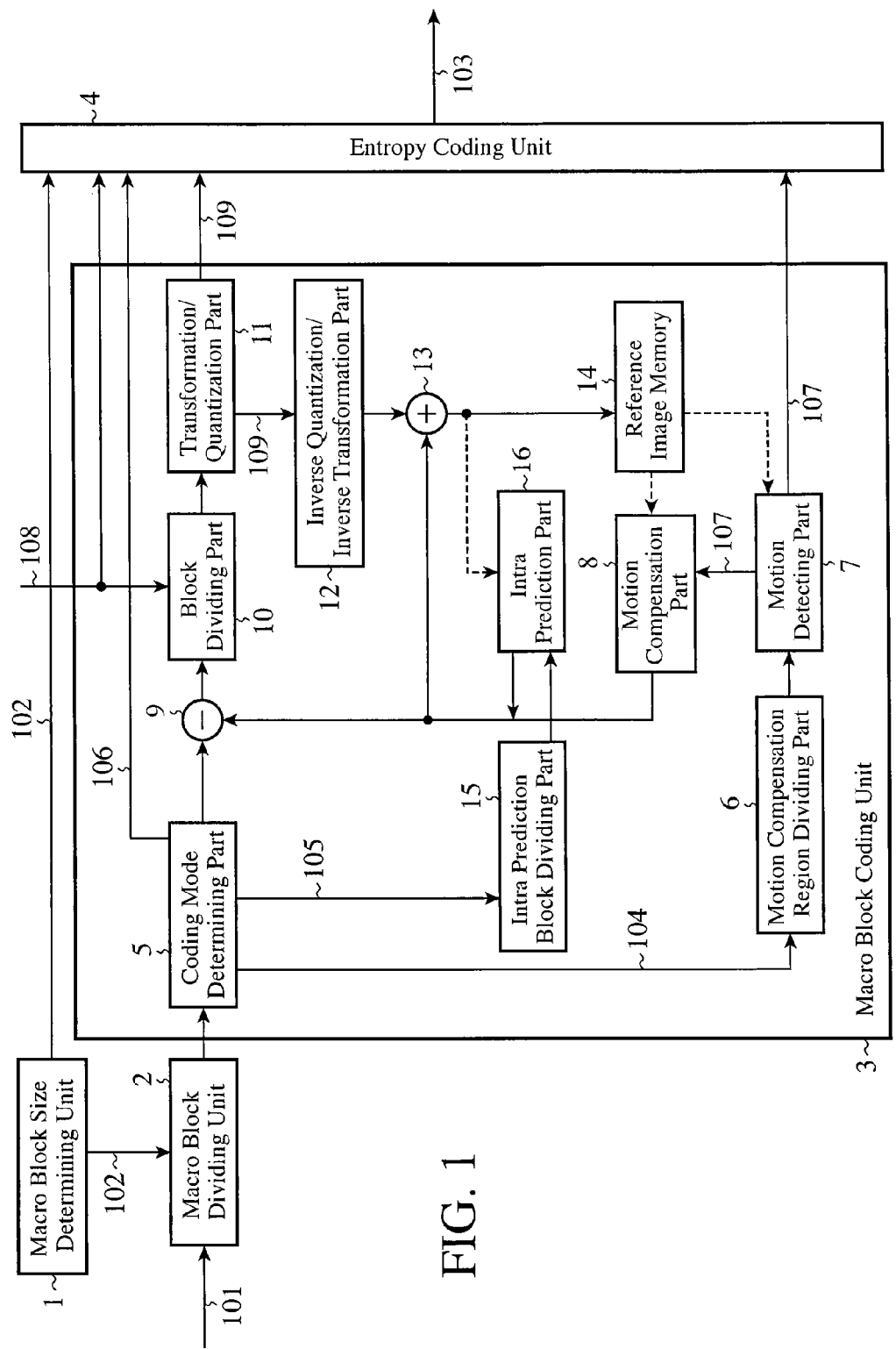
FIG. 1 is a block diagram showing a moving image coding apparatus in accordance with Embodiment 1 of the present invention.

FIG. 1 is a block diagram showing a moving image coding apparatus in accordance with Embodiment 1 of the present invention.

In the figure, the moving image coding apparatus is provided with a macro block size determining unit (a rectangular region size determining means) 1, a macro block dividing unit (a rectangular region dividing means) 2, a macro block coding unit (a rectangular region coding means) 3, and an entropy coding unit (a rectangular region size information multiplexing means) 4. The macro block coding unit 3 is provided with a coding mode determining part (a coding mode determining means) 5, a motion compensation region dividing part (a motion compensation region dividing means) 6, a motion detecting part (a motion detecting means) 7, a motion compensation part (a motion compensation means) 8, a subtractor 9, a block dividing part (a block dividing means) 10, a transformation/quantization part (a transformation/quantization means) 11, an inverse quantization/inverse transformation part 12, an adder 13, a reference image memory 14, an intra prediction block dividing part (an intra prediction block dividing means) 15, and an intra prediction part (an intra prediction means) 16.

The macro block size determining unit 1 is a functional unit for determining the size of each of macro blocks on a frame-by-frame basis, and outputs this size as macro block size specification information (rectangular region size information) 102. The macro block dividing unit 2 is a functional unit for dividing an inputted image 101 into macro blocks each having the size determined by the macro block size determining unit 1. The macro block coding unit 3 has a function of determining a coding mode for each macro block, and coding pixel values in each macro block in the determined coding mode. The entropy coding unit 4 has a function of multiplexing the macro block size specification information 102 determined by the macro block size determining unit 1, block size specification information 108, and the coding mode information 106 outputted from the coding mode determining part 5, coefficient data 109 acquired by the transformation/quantization part 11, and motion vector information 107 acquired by the motion detecting part 7 into a bit stream 103.

The coding mode determining part 5 is a functional unit for determining the coding mode for each macro block. The motion compensation region dividing part 6 is a functional unit for dividing the interior of each macro block into regions determined by the coding mode determining part 5. The motion detecting part 7 is a functional unit for performing a motion detection in units of each of the regions divided by the motion compensation region dividing part 6. The motion compensation part 8 is a functional unit for performing a motion compensation prediction using the motion vector information 107 acquired by the motion detecting part 7 so as to acquire a prediction image. The subtractor 9 is the one for acquiring differences between the pixel values of the prediction image acquired by the motion compensation part 8 and those of the inputted image. The block dividing part 10 is a functional unit for acquiring the pixel value differences acquired by the subtractor 9 as a prediction error image in units of each macro block, and for dividing the interior of each macro block of the inputted image or the prediction error image into rectangular blocks each having a size, which is determined beforehand, on the basis of the block size specification information 108.

The transformation/quantization part 11 is a functional unit for carrying out an orthogonal transformation process and quantization in units of each of the blocks divided by the block dividing part 10, and for outputting the coefficient data 109. The inverse quantization/inverse transformation part 12 is a functional unit for carrying out inverse quantization/inverse transformation on the basis of the coefficient data 109 outputted from the transformation/quantization part 11 so as to acquire a decoded prediction error image. The adder 13 is the one for adding the decoded prediction error image acquired by the inverse quantization/inverse transformation part 12 and the prediction image acquired by the motion compensation part 8 so as to acquire a decoded image. The reference image memory 14 is the one for storing the decoded image outputted from the adder 13 as a reference image.

Next, the operation of the moving image coding apparatus of Embodiment 1 will be explained.

First, an inputted image 101 is inputted to the macro block dividing unit 2 and is divided into macro blocks each having a predetermined macro block size on the basis of the macro block size specification information 102 which is determined on a frame-by-frame basis. The macro block size specification information 102 is the one showing a size which can be selected from among, for example, 16 pixels×16 lines and 32 pixels×32 lines, and will be explained below. The macro block size specification information 102 specified is inputted to the entropy coding unit 4 and is entropy-coded, and is then multiplexed into a bit stream 103.

The macro block size specification information 102 is outputted from the macro block size determining unit 1. The macro block size determining unit 1 calculates a difference between frames, and, when this frame difference is small, uses macro blocks of 32 pixels×32 lines, whereas when the frame difference is large, uses macro blocks of 16 pixels×16 lines. As a second method, the macro block size determining unit performs a motion detection in units of 32 pixels×32 lines, and also performs a motion detection in units of 16 pixels×16 lines, and calculates a prediction error for each size, and uses one of the sizes which provides a smaller prediction error as the macro block size. As a third method, the macro block size determining unit calculates a variance of pixel values in units of 32 pixels×32 lines and a variance of pixel values in units of 16 pixels×16 lines, and uses one of the sizes which provides a smaller averaged variance in a frame as the macro block size. As an alternative, using a combination of two or more of these methods, the macro block size can be determined.

As a fourth method, the macro block size determining unit can automatically determine the macro block size according to the resolution of the image by, for example, using, in a case in which the inputted image has a resolution higher than a predetermined resolution, the size of 32 pixels×32 lines, or using the size of 16 pixels×16 lines otherwise. In this case, because the macro block size is decided by the resolution, it is not necessary to multiplex the macro block size specification information 102 into the bit stream 103.

As an alternative, some possible values of the macro block size can be predetermined respectively according to pieces of information (referred to as profiles) each of which is a predetermined combination of coding parameters which are available for a usage pattern, and the macro block size can be automatically determined from the possible values according to a selected profile.

The inputted image 101 which are divided into macro blocks is inputted to the motion compensation region dividing part 6, the intra prediction block dividing part 15, or the block dividing part 10 within the macro block coding unit 3 according to the coding mode determined for each macro block.

Macro block type information, motion compensation region shape information 104, and intra prediction block size information 105 are included in the coding mode determined for each macro block. The macro block type information is the one which can be selected from information showing a mode (an inter mode) in which inter-frame prediction coding is carried out, information showing a mode (an intra mode) in which intra-frame coding is carried out, and information showing a mode (an intra prediction mode) in which intra-frame prediction coding is carried out. Although the selection of a mode from these modes is carried out by the coding mode determining part 5, because the selection method of selecting a mode from these modes is not related directly to the features of the present invention, the explanation of the method will be omitted hereafter.

The coding mode determining part 5 determines a further-detailed coding mode for each of the above-mentioned coding modes. More specifically, in the case of the inter mode, the coding mode determining part determines motion compensation region shape information 104 showing units on each of which motion compensation is to be performed, and, in the case of the intra prediction mode, determines intra prediction block size information 105 showing units on each of which intra prediction is to be performed. The description of each of the pieces of information will be explained later. The various coding modes determined by the coding mode determining part 5 are given to the entropy coding unit 4 as coding mode information 106, and are coded in units of each macro block by the entropy coding unit 4 and are multiplexed into the bit stream.

First, a case in which the inter mode is selected will be explained.

The inputted image divided into macro blocks by the macro block dividing unit 2 is inputted to the motion compensation region dividing part 6, and is further divided into regions each having a certain shape, which are units on each of which motion compensation is to be performed, on the basis of the motion compensation region shape information 104 selected by the coding mode determining part 5.

Figure 2:
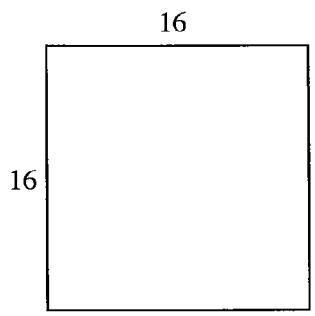
FIG. 2 is an explanatory drawing showing an example (a first example) of division of an image into regions each of which is used as a unit for motion compensation in the moving image coding apparatus in accordance with Embodiment 1 of the present invention.
Figure 2:
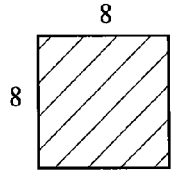
Figure 2:
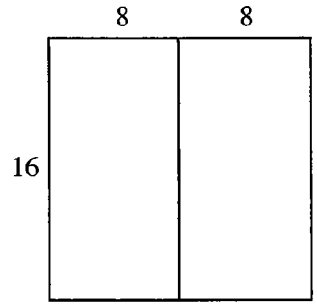
Figure 2:
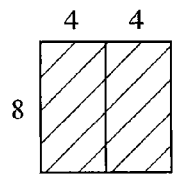
Figure 2:
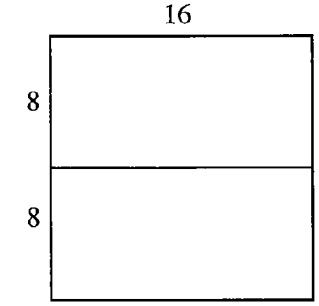
Figure 2:
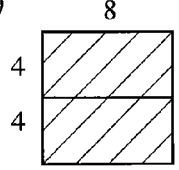
Figure 2:
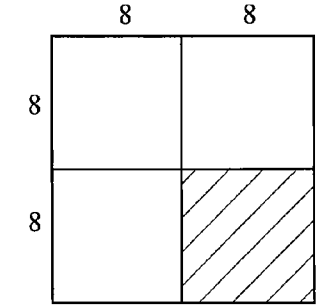
Figure 2:
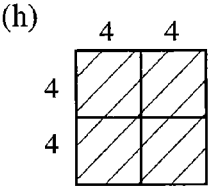
Figure 3:
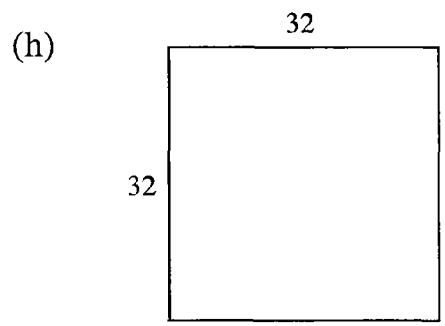
FIG. 3 is an explanatory drawing showing an example (a second example) of division of an image into regions each of which is used as a unit for motion compensation in the moving image coding apparatus in accordance with Embodiment 1 of the present invention.
Figure 3:
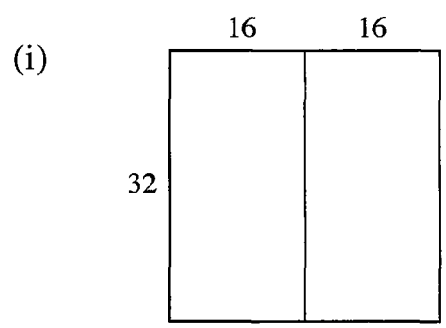
Figure 3:
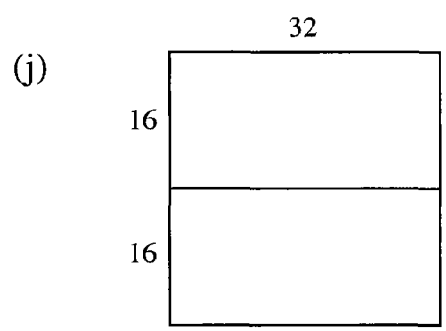
Figure 3:
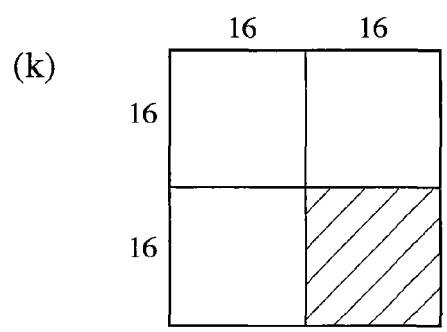

An example of the division of each macro block into regions each of which is used as a unit for motion compensation is shown in FIGS. 2 and 3.

In the case in which the macro block size is 16 pixels×16 lines, each macro block is divided into either of regions shown in (a) to (d) of FIG. 2 (a region of 16 pixels×16 lines, regions of 8 pixels×16 lines, regions of 16 pixels×8 lines, or regions of 8 pixels×8 lines), and, in a case in which each macro block is divided into regions shown in (d), each block of 8 pixels×8 lines can be further divide into either of regions shown in (e) to (h) of FIG. 2 (a region of 8 pixels×8 lines, regions of 4 pixels×8 lines, regions of 8 pixels×4 lines, or regions of 4 pixels×4 lines). In the case in which the macro block size is 32 pixels×32 lines, each macro block can be divided into either of regions shown in (a) to (d) of FIG. 2, as in the case in which the macro block size is 16 pixels×16 lines. As another example, each macro block can be divided into regions shown in either of (j) to (k) of FIG. 3 (a region of 32 pixels×32 lines, regions of 16 pixels×32 lines, regions of 32 pixels×16 lines, or regions of 16 pixels×16 lines) and, in a case in which each macro block is divided into regions shown in (k), each block of 16 pixels×16 lines can be further divided into regions shown in either of (j) to (k) of FIG. 3. Information specifying one of these dividing methods is the motion compensation region shape information 104. As mentioned above, in the motion compensation region shape information 104, the region shapes which can be selected can be changed according to the macro block size.

Figure 4:
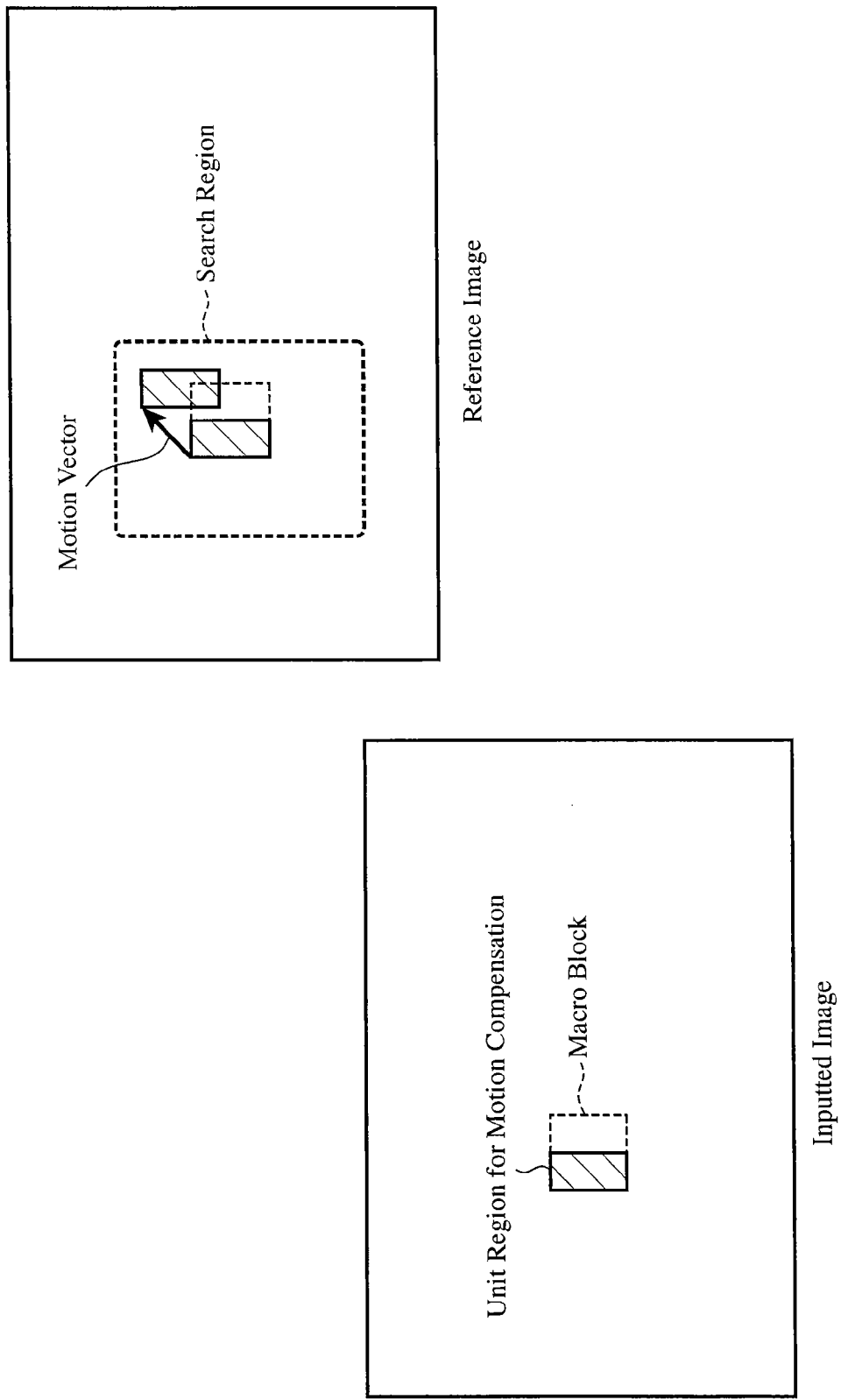
FIG. 4 is an explanatory drawing of motion vector detection in the moving image coding apparatus in accordance with Embodiment 1 of the present invention.

The inputted image in which each macro block is divided into regions having a certain shape, each of which is used as a unit on which motion compensation is to be performed, is inputted to the motion detecting part 7, and a motion detection is performed on the inputted image using one or more reference images stored in the reference image memory 14 by the motion detecting part. The motion detecting part 7 searches for a predetermined region of a reference image in units of each of the regions determined by the motion compensation region dividing part 6 so as to detect an optimal motion vector. FIG. 4 is an explanatory drawing of this motion vector detection. Because the motion vector detecting operation is known, the detailed explanation of the operation will be omitted hereafter.

The motion vector information 107 acquired by the motion detecting part 7 is inputted to the entropy coding unit 4, is entropy-coded and multiplexed into the bit stream 103, and is also inputted to the motion compensation part 8. The motion compensation part 8 generates a prediction image using a reference image stored in the reference image memory 14 and the motion vector information 107 from the motion detecting part 7. A difference between the prediction image acquired by the motion compensation part 8 and the inputted image which are divided into macro blocks is acquired by the subtractor 9, and this difference is inputted to the block dividing part 10 as a prediction error image. The block dividing part 10 divides this prediction error image into blocks each of which is used as a unit on which transformation (orthogonal transformation like DCT) and quantization are to be performed on the basis of the block size specification information 108.

The block size specification information 108 is the one which can be selected from, for example, information showing 8 pixels×8 lines and information showing 4 pixels×4 lines. As another example, the selectable block size specification information 108 can be changed according to the macro block size. For example, in the case in which each macro block has a size of 16 pixels×16 lines, the block size specification information 108 is the one which can be selected from information showing 8 pixels×8 lines and information showing 4 pixels×4 lines, whereas in the case in which each macro block has a size of 32 pixels×32 lines, the block size specification information 108 is the one which can be selected from information showing 16 pixels×16 lines and information showing 8 pixels×8 lines. The selected block size specification information 108 is inputted to the entropy coding unit 4, is entropy-coded, and is multiplexed into the bit stream 103.

As another example, the block size can be determined according to the macro block size. For example, in the case in which each macro block has a size of 16 pixels×16 lines, the block size is set to 4 pixels×4 lines, and, in the case in which each macro block has a size of 32 pixels×32 lines, the block size is set to 8 pixels×8 lines. In this case, because the block size is determined according to the macro block size, it is not necessary to multiplex the block size specification information into the bit stream 103.

The prediction error image divided into blocks is inputted to the transformation/quantization part 11, and orthogonal transformation and quantization are performed on the prediction error image. Coefficient data 109 acquired as the results of the orthogonal transformation and quantization processing are entropy-coded by the entropy coding unit 4, and are multiplexed into the bit stream 103. The coefficient data 109 acquired by the transformation/quantization part 11 are further inputted to the inverse quantization/inverse transformation part 12, and inverse quantization/inverse transformation is performed on the coefficient data, so that a decoded prediction error image is acquired. The decoded prediction error image is added to the prediction image acquired by the motion compensation part 8 by the adder 13, and the addition result is then outputted as a decoded image. Because the decoded image is used as a reference image in performing coding of subsequent inputted images, the decoded image is stored in the reference image memory 14.

Next, a case in which the intra mode is selected will be explained.

The inputted image which is divided into macro blocks by the macro block dividing unit 2 is inputted to the block dividing part 10. The operation of the block dividing part 10 is the same as that in the case of the inter mode. Orthogonal transformation and quantization are performed on the inputted image divided into blocks by the transformation/quantization part 11. Coefficient data 109 acquired as the results of the orthogonal transformation and quantization processing are entropy-coded by the entropy coding unit 4, and are multiplexed into the bit stream 103. The coefficient data 109 acquired by the transformation/quantization part 11 are further inputted to the inverse quantization/inverse transformation part 12, and inverse quantization/inverse transformation is performed on the coefficient data, so that a decoded image is acquired. Because the decoded image is used as a reference image in performing coding of subsequent inputted images, the decoded image is stored in the reference image memory 14.

Next, a case in which the intra prediction mode is selected will be explained.

The inputted image which is divided into macro blocks by the macro block dividing unit 2 is inputted to the intra prediction block dividing part 15. The intra prediction block dividing part 15 divides each macro block into blocks each of which is used as a unit on which an intra prediction is to be performed on the basis of the intra prediction block size information 105. The intra prediction block size information 105 is the one which can be selected from information showing 16 pixels×16 lines and information showing 4 pixels×4 lines. As another example, the selectable intra prediction block size information 105 can be changed according to the macro block size. For example, in the case in which each macro block has a size of 16 pixels×16 lines, the intra prediction block size information 105 is the one which can be selected from information showing 16 pixels×16 lines and information showing 4 pixels×4 lines, and in the case in which each macro block has a size of 32 pixels×32 lines, the intra prediction block size information 105 is the one which can be selected from information showing 32 pixels×32 lines and information showing 8 pixels×8 lines.

Figure 5:
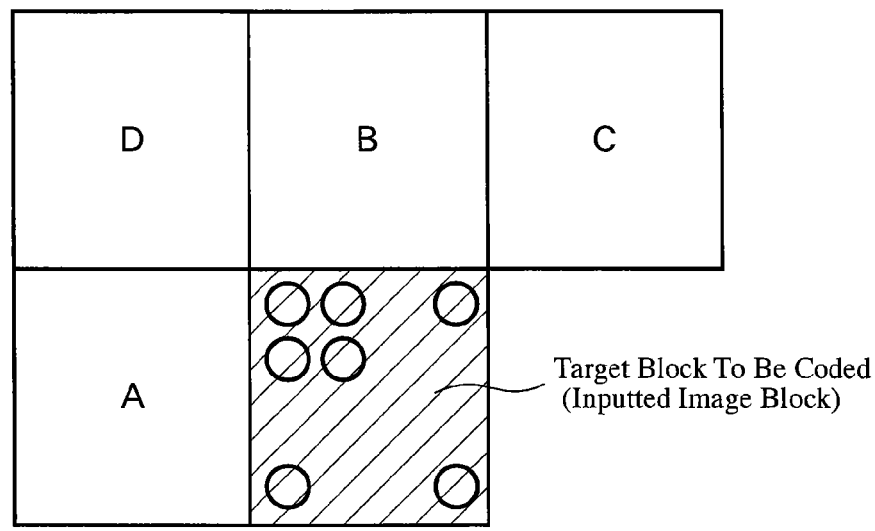
FIG. 5 is an explanatory drawing of intra prediction in the moving image coding apparatus in accordance with Embodiment 1 of the present invention.

The inputted image which is divided into blocks by the intra prediction block dividing part 15 is inputted to the intra prediction part 16, and an intra prediction is performed on the inputted image by the intra prediction part. Although a detailed explanation of the intra prediction will be omitted hereafter because the intra prediction is known, the intra prediction part predicts each pixel value in each target block to be coded from the pixel values of coded neighboring blocks (from the pixel values of blocks A to D of FIG. 5) to generate a prediction image, as shown in FIG. 5. A difference between the prediction image acquired by the intra prediction part 16 and the inputted image divided into macro blocks is acquired by the subtractor 9, and this difference is inputted to the block dividing part 10 as a prediction error image. The operation of the block dividing part 10 is the same as that in the case of the inter mode.

The prediction error image divided into blocks is inputted to the transformation/quantization part 11, and orthogonal transformation and quantization are performed on the prediction error image by the transformation/quantization part. Coefficient data 109 acquired as the results of the orthogonal transformation and quantization processing are entropy-coded by the entropy coding unit 4, and are multiplexed into the bit stream 103. The coefficient data 109 acquired by the transformation/quantization part 11 are further inputted to the inverse quantization/inverse transformation part 12, and inverse quantization/inverse transformation is performed on the coefficient data by the inverse quantization/inverse transformation part, so that a decoded prediction error image is acquired. The decoded prediction error image is added to the prediction image acquired by the intra prediction part 16 by the adder 13, and the addition result is outputted as a decoded image. Because the decoded image is used as a reference image in performing coding of subsequent inputted images, the decoded image is stored in the reference image memory 14.

Figure 6:
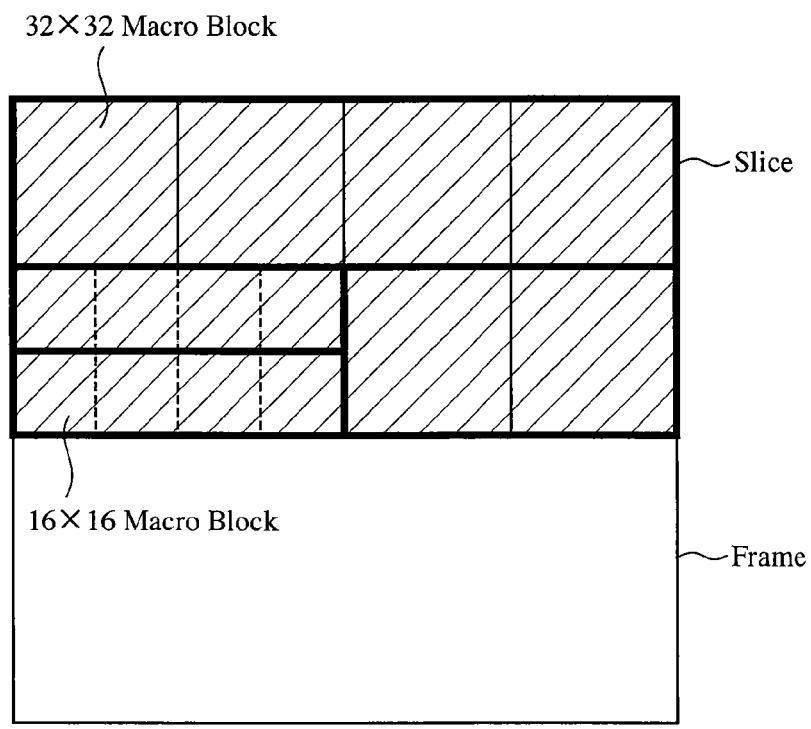
FIG. 6 is an explanatory drawing of a case in which macro block size information is changed in units of slices in the moving image coding apparatus in accordance with Embodiment 1 of the present invention.

In the above-mentioned embodiment, the macro block size information can be changed on a frame-by-frame basis. As shown in an example shown in FIG. 6, the macro block size information can be changed in units of each set (referred to as each slice) of some of a plurality of macro blocks into which the interior of each frame is divided. The coding processing has only to be carried out, as mentioned in the above embodiment, by assuming each slice as one frame. At this time, the macro block size specification information 102 is multiplexed into the bit stream 103 in units of each slice.

The macro block size information can be changed in units of each sequence which is a set of a plurality of continuous frames. At this time, the macro block size specification information 102 is multiplexed into the bit stream 103 in units of each sequence.

As a variant, whether to change the macro block size specification information for each frame or for each sequence can be selected. In this case, information indicating whether to change the macro block size specification information for each frame is multiplexed into the bit stream 103 in units of each sequence, and, when changing of the macro block size specification information for each frame is selected, the macro block size specification information 102 is multiplexed into the bit stream 103 in units of each frame, whereas when changing of the macro block size specification information for each sequence is selected, the macro block size specification information 102 is multiplexed into the bit stream 103 in units of each sequence.

As mentioned above, the moving image coding apparatus in accordance with Embodiment 1, which divides a moving image into rectangular regions and codes each of the rectangular regions independently, includes: the rectangular region size determination means for determining a size of each of the rectangular regions for either each frame or each sequence which is a set of a plurality of continuous frames; the rectangular region dividing means for dividing an inputted image into rectangular regions each having the size determined by the rectangular region size determination means; and the rectangular region coding means for determining a coding mode for each of the rectangular regions, and for coding pixel values in each of the rectangular regions in the determined coding mode.

Therefore, the moving image coding apparatus can select an appropriate rectangular region size according to the descriptions of the image (e.g., the intensity of a motion in the image, the fineness of a pattern in the image, etc.), the resolution of the image, or a profile, thereby being able to improve the coding efficiency, and can reduce the increase in the amount of codes due to the addition of the rectangle size information because, for example, only several bits of code amount for each frame or each sequence is needed as the code amount of the rectangle size information.

In addition, because the moving image coding apparatus in accordance with Embodiment 1 includes the rectangular region size information multiplexing means for multiplexing the rectangular region size information determined by the rectangular region size determination means into a bit stream, the moving image coding apparatus can change the rectangular region size adaptively according to the characteristics of the image, or the like.

Furthermore, in the moving image coding apparatus in accordance with Embodiment 1, because the rectangular region size determination means determines the rectangular region size according to the resolution of the inputted image. Therefore, the moving image coding apparatus does not need to multiplex the rectangular region size information into the bit stream, and can reduce the overhead of the processing.

In addition, in the moving image coding apparatus in accordance with Embodiment 1, the rectangular region coding means includes: the coding mode determining means for determining the coding mode for each of the rectangular regions; the motion compensation region dividing means for dividing an interior of each of the rectangular regions into regions determined by the coding mode determining means; the motion detecting means for performing a motion detection on each of the regions divided by the motion compensation region dividing means; the motion compensation means for performing a motion compensation prediction using motion vector information acquired by the motion detecting means so as to acquire a prediction image; the block dividing means for acquiring differences between pixel values of the prediction image and pixel values in each of the rectangular regions as a prediction error image in units of each of the rectangular regions, and for dividing an interior of each of the rectangular regions of either the inputted image or the prediction error image into rectangular blocks each having a predetermined size; and the transformation/quantization means for performing an orthogonal transformation and quantization process on each of the blocks divided by the block dividing means. Therefore, the moving image coding apparatus can also support the inter mode in which it performs inter-frame prediction coding as the coding mode determined for each rectangular region size.

In the moving image coding apparatus in accordance with Embodiment 1, the rectangular region coding means includes: the intra prediction block dividing means for dividing the interior of each of the rectangular regions into rectangular blocks defined by the coding mode; the intra prediction means for performing an intra prediction on each of the rectangular blocks divided by the intra prediction block dividing means so as to acquire a prediction image; the block dividing means for acquiring a prediction error image in units of each of the rectangular regions as the differences between the pixel values of the prediction image and the pixel values in each of the rectangular regions, and for dividing the interior of each of the rectangular regions of either the inputted image or the prediction error image into rectangular blocks each having the predetermined size; and the transformation/quantization means for performing a quantization and orthogonal transformation process on each of the blocks divided by the block dividing means. Therefore, the moving image coding apparatus can also support the intra prediction mode in which it performs intra-frame prediction coding as the coding mode determined for each rectangular region size.

Embodiment 2

Embodiment 2 relates to a moving image decoding apparatus which decodes a bit stream which is coded with the macro block size being selected independently on a frame-by-frame basis.

Figure 7:
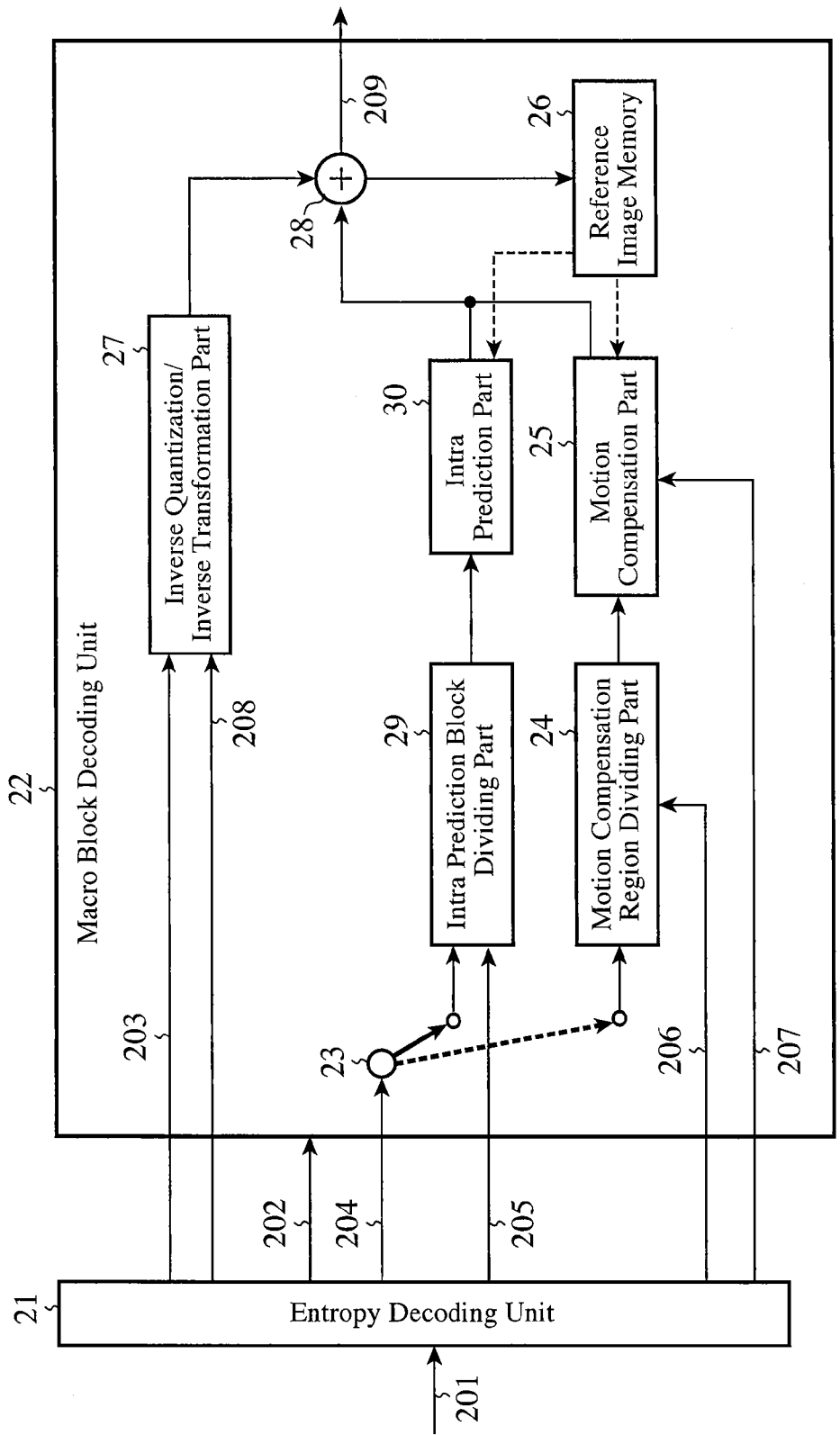
FIG. 7 is a block diagram showing a moving image decoding apparatus in accordance with Embodiment 2 of the present invention.

FIG. 7 is a block diagram of the moving image decoding apparatus in accordance with Embodiment 2.

In the figure, the moving image decoding apparatus is provided with an entropy decoding unit 21 and a macro block decoding unit (a rectangular region decoding means) 22. In this case, the entropy decoding unit 21 is a processing unit which performs entropy decoding on an inputted bit stream 201, and which implements a rectangular region size determination means for determining the size of each of rectangular regions in units of each frame or in units of each sequence which is a set of a plurality of continuous frames, a coding mode decoding means for decoding a coding mode which is determined for each rectangular region, a motion-vector-information decoding means for decoding motion vector information in units of each region for motion compensation, and a block size determining means for determining the size of each of rectangular blocks which is used as a unit on which inverse quantization and inverse orthogonal transformation are to be performed.

The macro block decoding unit 22 is comprised of a coding mode changing part 23, a motion compensation region dividing part (a motion compensation region dividing means) 24, a motion compensation part (a motion compensation means) 25, a reference image memory 26, an inverse quantization/inverse transformation part (an inverse quantization/inverse orthogonal transformation means) 27, an adder 28, an intra prediction block dividing part 29, and an intra prediction part (an intra prediction means) 30.

The coding mode changing part 23 is a functional unit for changing the coding mode on the basis of macro block type information 204. The motion compensation region dividing part 24 is a functional unit for dividing the interior of each macro block into regions which are defined by motion compensation region shape information 206. The motion compensation part 25 is a functional unit for performing a motion compensation prediction using motion vector information 207 so as to acquire a prediction image. The inverse quantization/inverse transformation part 27 is a functional unit for carrying out an inverse quantization/inverse orthogonal transformation process on coefficient data 208 in units of each macro block on the basis of block size specification information 203 so as to acquire a prediction error image. The adder 28 is the one for adding the prediction error image outputted from the inverse quantization/inverse transformation part 27 and the prediction image outputted from the motion compensation part 25 so as to acquire a decoded image 209. The reference image memory 26 is the one for storing the decoded image 209 as a reference image.

Next, the operation of the moving image decoding apparatus in accordance with Embodiment 2 will be explained.

First, an input bit stream 201 is inputted to the entropy decoding unit 21, and macro block size specification information 202, block size specification information 203, coding mode (macro block type information 204, intra prediction block size information 205, and motion compensation region shape information 206), motion vector information 207, and coefficient data 208 are decoded. The macro block size specification information 202 is the information decoded in units of each frame, and the coding mode is the information decoded in units of each macro block having a size determined by the macro block size specification information 202. The motion vector information 207 is the information decoded in units of the decoded motion compensation region shape information 206.

Next, the macro block size is determined by using the macro block size specification information 202, and subsequent decodings are carried out in units of each macro block having the determined size by the macro block decoding unit 22. In a case in which the macro block type is the inter mode, a motion compensation prediction is carried out, whereas in a case in which the macro block type is the intra prediction mode, an intra prediction is carried out.

First, the case in which the macro block type is the inter mode will be explained.

The motion compensation region dividing part 24 divides the interior of each macro block having a specified size into regions each of which is used as a unit on which motion compensation is to be performed on the basis of the motion compensation region shape information 206 decoded by the entropy decoding unit 21. The descriptions of the motion compensation region shape information 206 are the same as that of the motion compensation region shape information 104 shown in Embodiment 1. The motion compensation part 25 generates a prediction image in units of each region determined by the motion compensation region dividing part 24 by using the decoded motion vector information 207 and a reference image included in the reference image memory 26. The motion vector information 207 is also the same as that of the motion vector information 107 shown in Embodiment 1.

The coefficient data 208 decoded by the entropy decoding unit 21 are inputted to the inverse quantization/inverse transformation part 27. The inverse quantization/inverse transformation part 27 performs an inverse quantization/inverse transformation process on the coefficient data on the basis of the decoded block size specification information 203. More specifically, when the block size specification information 203 shows, for example, pixels×4 lines, the inverse quantization/inverse transformation part carries out the inverse quantization/inverse transformation in units of 4 pixels×4 lines, so that a prediction error image is decoded.

The prediction image generated by the motion compensation part 25 and the prediction error image decoded by the inverse quantization/inverse transformation part 27 are added by the adder 28, and a decoded image 209 is acquired. Because the decoded image 209 is used for subsequent decodings, it is stored in the reference image memory 26.

Next, the case in which the coding mode is the intra mode will be explained.

The decoded coefficient data 208 are inputted to the inverse quantization/inverse transformation part 27. The operation of the inverse quantization/inverse transformation part 27 is the same as that in the case of the inter mode. The result of the inverse quantization/inverse transformation is outputted as a decoded image 209. The decoded image 209 is stored in the reference image memory 26, as in the case of the inter mode.

Next, the case in which the coding mode is the intra prediction mode will be explained.

The intra prediction block dividing part 29 divides the interior of each macro block into blocks each of which is used as a unit on which an intra prediction is to be performed on the basis of the intra prediction block size information 205 decoded by the entropy decoding unit 21. The description of the intra prediction block size information 205 is the same as that of the intra prediction block size information 105 shown in Embodiment 1. The intra prediction part 30 carries out an intra prediction in units of each block determined by the intra prediction block dividing part 29. Although a detailed explanation of the intra prediction will be omitted hereafter because the intra prediction is known, the intra prediction part generates predicted values of a target block to be coded (a prediction image) using the pixel values of already-decoded neighboring blocks, like the intra prediction part 16 of Embodiment 1.

On the other hand, the coefficient data 208 decoded by the entropy decoding unit 21 are inputted to the inverse quantization/inverse transformation part 27. The operation of inverse quantization/inverse transformation part 27 is the same as that in the case of the inter mode. The result of the inverse quantization/inverse transformation is outputted as a prediction error image. The prediction image generated by the intra prediction part 30 and the prediction error image decoded by the inverse quantization/inverse transformation part 27 are added by the adder 28, and a decoded image 209 is acquired. Because the decoded image 209 is used for subsequent decodings, it is stored in the reference image memory 26.

In above-mentioned Embodiment 2, the macro block size specification information is decoded in units of each frame, and the inputted bit stream is decoded with the macro block size being changed for each frame. As an alternative, the macro block size specification information can be decoded in units of each slice which is a set of a plurality of macro blocks, and the inputted bit stream can be decoded with the macro block size being changed for each slice.

In another example, the macro block size specification information can be decoded in units of each sequence which is a set of a plurality of frames, and the inputted bit stream can be decoded with the macro block size being changed for each sequence.

In another example, information indicating whether to change the macro block size for each frame or for each sequence is decoded in units of each sequence, and, when changing of the macro block size for each frame is selected, the macro block size specification information is decoded in units of each frame, whereas when changing of the macro block size for each sequence is selected, the macro block size specification information is decoded in units of each sequence.

Furthermore, the entropy decoding unit 21 decodes the macro block size specification information multiplexed into the bit stream, as mentioned above. As an alternative, the moving image decoding can automatically determine the macro block size specification information according to the resolution of the image to be decoded by using, for example, 32 pixels×32 lines in a case in which the image to be decoded has a resolution higher than a predetermined resolution, or 16 pixels×16 lines in a case in which the image to be decoded has a resolution lower than the predetermined resolution.

As mentioned above, the moving image decoding apparatus in accordance with Embodiment 2, which divides a moving image into rectangular regions and codes each of the rectangular regions independently, includes the rectangular region size determination means for determining the size of each of the rectangular regions for either each frame or each sequence which is a set of a plurality of continuous frames; the coding mode decoding means for decoding a coding mode determined for the each of the rectangular regions; and the rectangular region decoding means for decoding pixel values in each of the rectangular regions in the coding mode decoded by the coding mode decoding means. Therefore, the moving image decoding apparatus can decode a moving image which is coded efficiently with the rectangular region size being changed on a frame-by-frame or sequence-by-sequence basis. Furthermore, because the rectangular region size is changed on a frame-by-frame or sequence-by-sequence basis, the present embodiment offers an advantage of reducing the workload required for the changing of the rectangular region size, as compared with, for example, a case in which the rectangular region size is changed within each frame.

Furthermore, in the moving image decoding apparatus in accordance with Embodiment 2, because the rectangular region size determination means decodes rectangular region size information which is multiplexed into a bit stream in units of each frame or each sequence which is a set of a plurality of continuous frames, and determines the rectangular region size on the basis of the decoded result, the moving image decoding apparatus can change the rectangular region size easily and adaptively according to the characteristics of the image, or the like.

In addition, in the moving image decoding apparatus in accordance with Embodiment 2, because the rectangular region size determination means determines the rectangular region size according to the resolution of an image to be decoded, the moving image decoding apparatus does not need to decode the rectangular region size information separately, and can reduce the overhead of the processing.

Furthermore, in the moving image decoding apparatus in accordance with Embodiment 2, the coding mode decoded by the coding mode decoding means includes motion compensation region shape information showing a shape of each of unit regions for motion compensation, and the rectangular region decoding means includes: the motion compensation region dividing means for dividing an interior of each of the rectangular regions into regions defined by the motion compensation region shape information, a motion-vector-information decoding means for decoding motion vector information in units of each of the unit regions for motion compensation; the motion compensation means for performing a motion compensation prediction using the motion vector information acquired by the motion vector decoding means so as to acquire a prediction image; the block size determining means for determining a size of each of rectangular blocks which is used as a unit on which inverse quantization and inverse orthogonal transformation are to be performed; and the inverse quantization/inverse orthogonal transformation means for performing an inverse quantization/inverse orthogonal transformation process on the each of the rectangular blocks. Therefore, the moving image decoding apparatus can also support, as a coding mode, the inter mode in which it performs inter-frame prediction coding.

In addition, in the moving image decoding apparatus in accordance with Embodiment 2, because the coding mode decoded by the coding mode decoding means includes intra prediction block size information showing a shape of each of unit regions for intra prediction, and the rectangular region decoding means includes the intra prediction means for performing an intra prediction on each of the rectangular blocks defined by the intra prediction block size information so as to acquire a prediction image, the moving image decoding apparatus can also support, as a coding mode, the intra prediction mode in which it performs intra-frame prediction coding.

Furthermore, in the moving image decoding apparatus in accordance with Embodiment 2, because the motion compensation region shape information is the decoded shape of each of the unit regions for motion compensation which is set up for each rectangular region size, the moving image decoding apparatus can also support, as a coding mode determined for each rectangular region size, the inter mode in which it performs inter-frame prediction coding.

In addition, in the moving image decoding apparatus in accordance with Embodiment 2, because the intra prediction block size information is a decoded intra prediction block size which is set up for each rectangular region size, the moving image decoding apparatus can also support, as a coding mode determined for each rectangular region size, the intra prediction mode in which it performs intra-frame prediction coding.

INDUSTRIAL APPLICABILITY

As mentioned above, the moving image coding apparatus in accordance with the present invention which can code an image while changing the size of each of rectangular regions adaptively according to the resolution or the descriptions of the image (in the vicinity of a boundary of a region having large intensity of motion or a region including different motions (a person and a background, or the like), and which can suppress the increase in the rectangle size information of the coded image due to the changing, and the moving image decoding apparatus in accordance with the present invention are suitable for applications in apparatus which can transmit and receive a digital moving image (e.g., a mobile terminal with a TV phone function).

The invention claimed is:

1. A moving image decoding apparatus for decoding an encoded bit stream obtained by dividing the moving image into a plurality of rectangular regions, each of the rectangular regions having at least a unit region, said apparatus comprising:
   a rectangular region size determination unit for determining a variable size of the rectangular regions in a sequence based on rectangular region size information multiplexed in the encoded bit stream, the sequence being a set of a plurality of continuous frames;
   a coding mode decoding unit for decoding a coding mode information multiplexed in the encoded bit stream for each of the rectangular regions,
   the coding mode information including
      (1) prediction type information selected from information indicating either (a) inter prediction coding or (b) intra prediction coding, and
      (2) intra prediction block size information indicating a size of a unit region for the intra prediction coding indicated by the prediction type information, and
   a rectangular region decoding unit for performing an intra prediction in the unit region based on the coding mode information to acquire an intra prediction image, and for decoding pixel values in each of the rectangular regions by using the intra prediction image.

2. A moving image decoding method for decoding an encoded bit stream obtained by dividing the moving image into a plurality of rectangular regions, each of the rectangular regions having at least a unit region, said method comprising:
   determining, by a rectangular region size determination unit, a variable size of the rectangular regions in a sequence based on rectangular region size information multiplexed in the encoded bit stream, the sequence being a set of a plurality of continuous frames; and
   decoding, by a coding mode decoding unit, a coding mode information multiplexed in the encoded bit stream for each of the rectangular regions
   wherein the coding mode information includes:
      (1) prediction type information selected from information indicating either (a) inter prediction coding or (b) intra prediction coding, and
      (2) intra prediction block size information indicating a size of a unit region for the intra prediction coding indicated by the prediction type information
   the method further comprising:
   performing an intra prediction in the unit region based on the coding mode information to acquire an intra prediction image; and
   decoding pixel values in each of the rectangular regions using the intra prediction image.

3. A moving image decoding apparatus for decoding an encoded bit stream obtained by dividing the moving image into a plurality of rectangular regions, each of the rectangular regions having at least a unit region, said apparatus comprising:
   a rectangular region size determination circuit to determine a variable size of the rectangular regions in a sequence based on rectangular region size information multiplexed in the encoded bit stream, the sequence being a set of a plurality of continuous frames;
   a coding mode decoding circuit to decode a coding mode information multiplexed in the encoded bit stream for each of the rectangular regions,
   the coding mode information including
      (1) prediction type information selected from information indicating either (a) inter prediction coding or (b) intra prediction coding, and
      (2) intra prediction coding, intra prediction block size information indicating a region size of a unit region for the intra frame prediction, and
   a rectangular region decoding circuit for performing an intra prediction in the unit region based on the coding mode information to acquire an intra prediction image, and for decoding pixel values in each of the rectangular regions by using the intra prediction image.

* * * * *